(12) United States Patent
Barber

(10) Patent No.: US 11,963,631 B2
(45) Date of Patent: Apr. 23, 2024

(54) FRENCH PRESS

(71) Applicant: BRADSHAW HOME, Rancho Cucamonga, CA (US)

(72) Inventor: Tom Barber, Redondo Beach, CA (US)

(73) Assignee: BRADSHAW HOME, Rancho Cucamonga, CA (US)

(*) Notice: Subject to any disclaimer, the term of this patent is extended or adjusted under 35 U.S.C. 154(b) by 580 days.

(21) Appl. No.: 17/334,367

(22) Filed: May 28, 2021

(65) Prior Publication Data
US 2022/0378245 A1    Dec. 1, 2022

(51) Int. Cl.
*A47J 31/20* (2006.01)
*A47J 45/07* (2006.01)

(52) U.S. Cl.
CPC ............. *A47J 31/20* (2013.01); *A47J 45/078* (2013.01)

(58) Field of Classification Search
CPC ........... A47J 31/18; A47J 31/20; A47J 45/078
See application file for complete search history.

(56) References Cited

U.S. PATENT DOCUMENTS

| | | | | |
|---|---|---|---|---|
| 2,024,294 A * | 12/1935 | Kirsch | ................... | A47J 45/078 220/759 |
| 3,076,223 A * | 2/1963 | Reichold | ............... | A47J 45/078 220/759 |
| 3,282,196 A * | 11/1966 | Manship | ............... | A47J 31/053 220/759 |
| 3,809,285 A * | 5/1974 | Unger | .................... | A47J 31/053 220/759 |
| 3,939,760 A | 2/1976 | Eaton, Jr. | | |
| 5,635,233 A * | 6/1997 | Levinson | ............... | A47J 36/027 426/433 |
| 2011/0146496 A1* | 6/2011 | Bodum | .................... | A47J 31/20 99/275 |
| 2017/0071399 A1* | 3/2017 | Constantine | ............ | A47J 31/20 |

FOREIGN PATENT DOCUMENTS

KR         200357777 Y1 *  7/2004
WO    WO-2023036615 A1 *  3/2023

OTHER PUBLICATIONS

WO 2023/036615 A1 (Bodum, Jorgen) Mar. 16, 2023 [retrieved on Feb. 23, 2024]. Retrieved from Foreign Image and Text database, translation by Clarivate Analytics. (Year: 2023).*
KR 2003-57777 Y1 (Song, Seok-Hyeon) Jul. 30, 2004 [retrieved on Feb. 23, 2024]. Retrieved from Foreign Image and Text database, translation by Clarivate Analytics. (Year: 2004).*

* cited by examiner

*Primary Examiner* — John J Norton
(74) *Attorney, Agent, or Firm* — Birch, Stewart, Kolasch & Birch, LLP

(57) ABSTRACT

A French press includes a flask, a pressing rod movable with respect to the flask, a filter system attached to an end of the pressing rod, a handle releasably attached to the flask, and a stopper assembly located in the handle. The stopper assembly includes a stopper movable relative to the handle and a biasing member contacting the stopper to press the stopper towards the flask.

17 Claims, 7 Drawing Sheets

FRENCH PRESS

BACKGROUND OF THE DISCLOSURE

1. Field of the Disclosure

The present disclosure is directed generally to a French press used to make coffee, or other hot beverages, and, more particularly, to a French press having a handle with a stopper assembly.

2. Description of Related Art

Conventional French presses used to brew coffee, or other steeped beverages, typically have a flask, a pressing rod, a filter system connected to one end of the pressing rod, and a knob connected to another end of the pressing rod. The knob and pressing rod are used to move the filter system relative to an interior of the flask. Some French presses may include a lid to cover an upper end of the flask to prevent spillage of the coffee in the flask and a pouring spout to dispense the coffee after the coffee has been brewed in the French press. Typically, French presses with pouring spots will have a handle that a user may use to assist pouring the coffee into another beverage container.

Some handles may be integrally formed with the flask while other handles may have a ring shaped portion to encircle the flask. When a handle includes a ring shaped portion, there is a risk that the weight of the flask may cause the flask to slide out of the ring shaped portion as coffee is poured from the flask into another beverage container. Consequently, there is risk that the coffee will be spilled or that the flask may be damaged if the flask completely slides out of the ring shaped portion.

BRIEF SUMMARY OF THE DISCLOSURE

Accordingly, an object of the present disclosure is to address drawbacks in the handle arrangement of conventional French presses by providing a handle with a stopper assembly having a stopper arranged to be biased towards a flask to provide additional resistance of movement of the flask relative to the handle.

Another object of the present disclosure is to provide a stopper assembly that allows for the stopper to move away from the flask when it is desirable to separate the flask from the handle.

To achieve this and other advantages and in accordance with the purpose of the present disclosure, as embodied and broadly described herein, in one aspect, a French press is provided that may include a flask, a pressing rod movable with respect to the flask, a filter system attached to an end of the pressing rod, a handle releasably attached to the flask, and a stopper assembly located in the handle. The stopper assembly may include a stopper movable relative to the handle and a biasing member contacting the stopper where the biasing member is arranged to press the stopper towards the flask.

In another aspect, the stopper assembly may also include a button engaging the stopper such that movement of the button towards the stopper moves the stopper away from the flask.

In a further aspect, the stopper may include a stopper body having a first protrusion, a second protrusion opposite the first protrusion, and a stopper cap located at the first protrusion. The stopper cap may contact the flask when the biasing member presses the stopper towards the flask. The biasing member may be located at the second protrusion.

In yet a further aspect, the stopper body may include a base portion and an angled surface extending normal to the base. The angled surface may be arranged to intersect an axis defined by the first and second protrusions. The button may include a head exposed outside the handle and an end located inside the handle. The end of the button contacts the angled surface of the stopper body such that movement of the button towards the stopper body causes the stopper body to move along the axis defined by the first and second protrusions. The end of the button may be chamfered.

In still a further aspect, the stopper body may include a guide spaced from the base portion and the end of the button may include a groove configured to receive the guide to prevent rotation of the button as the button moves towards the stopper body.

In a different aspect, the stopper body may include an inclined surface spaced from the angled surface to limit movement of the stopper away from the flask by contacting the button after the stopper has moved a predetermined distance away from the flask.

In yet another aspect, an axis of the button may be perpendicular to the axis defined by the first and second protrusions.

In still another aspect, the button may include a first member exposed outside the handle and a second member connected to the first member. The second member may contact the stopper. The first member may include a head and a shaft extending into the handle.

In a further aspect, the handle may include a button through-hole having one of a protrusion or a notch. The shaft may have one of a groove configured to engage the protrusion or a rib configured to engage the notch to prevent rotation of the button in the button through-hole.

In another aspect, the handle may include a button through-hole having a pair of protrusions. The shaft may have a pair of grooves corresponding to the pair of protrusions such that the pair of grooves cooperate with the pair of protrusions to prevent rotation of the button in the button through-hole.

In still a different aspect, the handle may include a ring portion encircling the flask. A stopper cavity may be located at a same height as the ring portion on the handle and a button through-hole may be in communication with the stopper cavity. The handle may also include a base spaced apart from the ring portion to support a bottom surface of the flask. The ring portion may be provided at a first end of the handle and the base may be provided at a second end of the handle.

Further scope of applicability of the present application will become more apparent from the detailed description given hereinafter. However, it should be understood that the detailed description and specific examples, while indicating preferred embodiments of the present disclosure, are given by way of illustration only, since various changes and modifications within the spirit and scope of the disclosure will become apparent to those skilled in the art from the detailed description.

BRIEF DESCRIPTION OF THE DRAWINGS

The accompanying drawings, which are included to provide a further understanding of the disclosure and are incorporated in and constitute a part of this specification, illustrate exemplary embodiments and together with the description serve to explain the principles of the disclosure. In the drawings.

DETAILED DESCRIPTION OF THE DISCLOSURE

Figure 1:
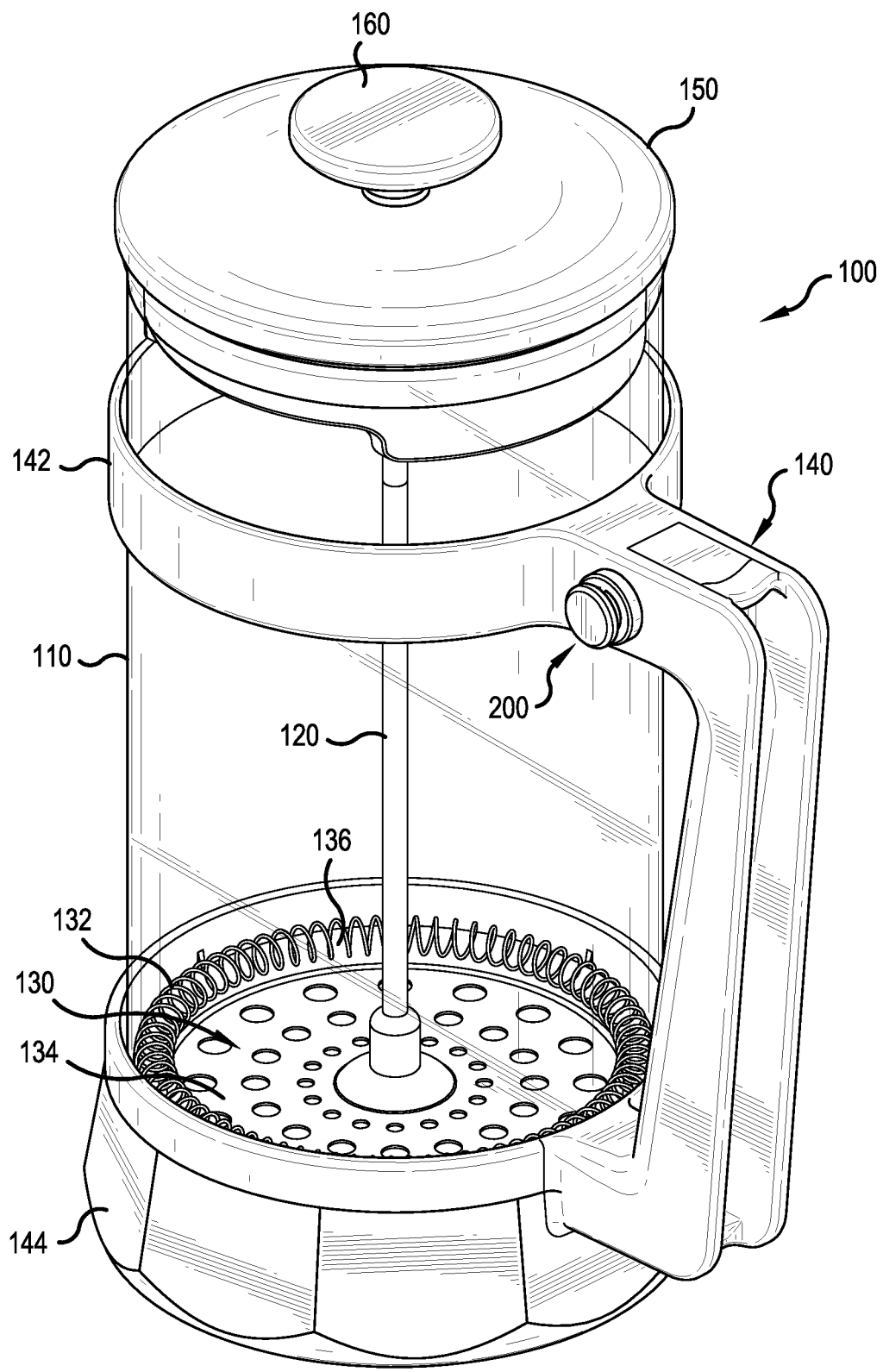
FIG. 1 is a perspective view of a French press according to an exemplary embodiment of the present disclosure.
Figure 2:
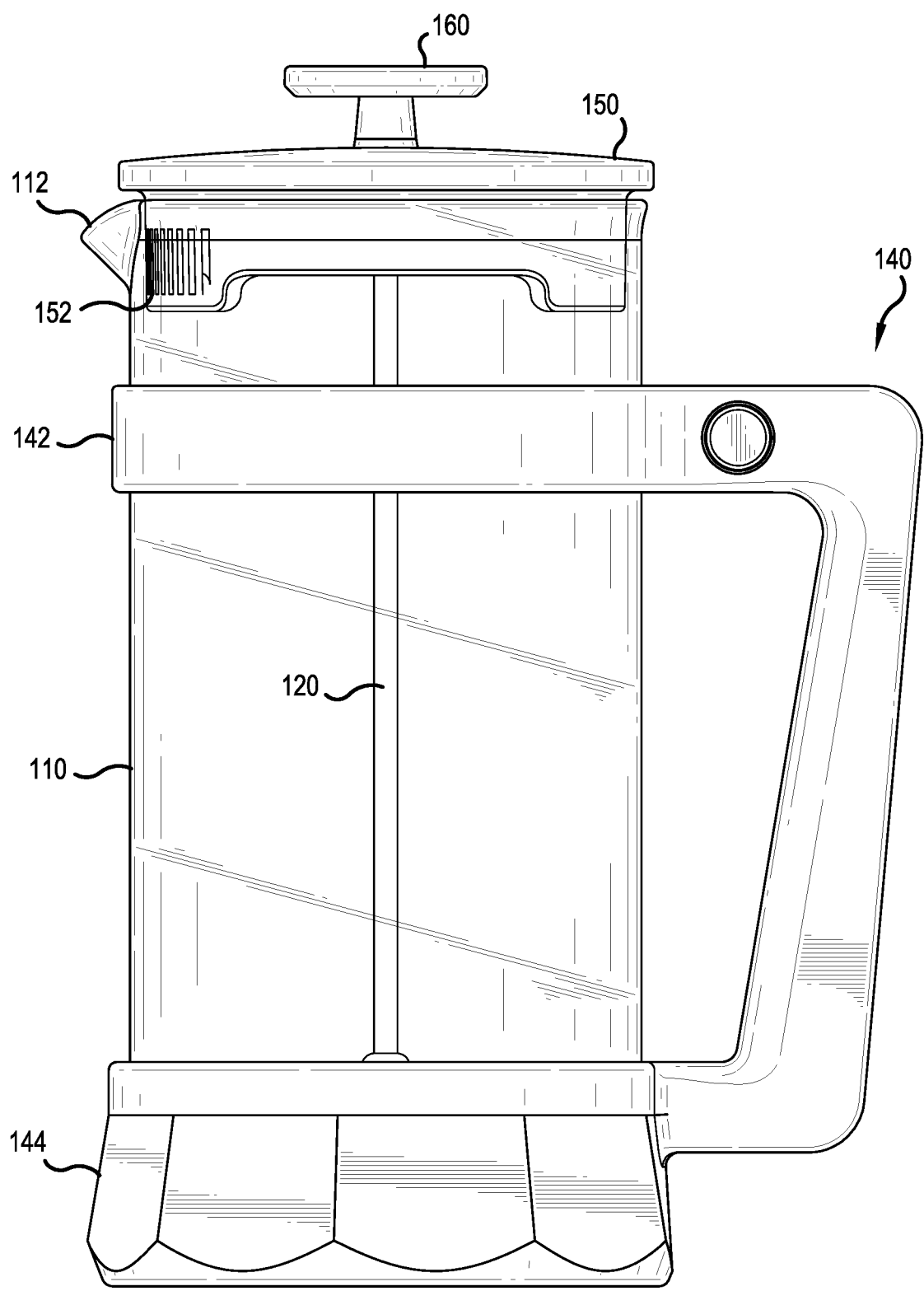
FIG. 2 is an elevation view of the French press of FIG. 1.

Referring now in detail to the drawings for the purposes of illustrating an exemplary embodiment of the present disclosure, a French press 100 is shown in FIGS. 1 and 2. The French press 100 includes a flask 110, a pressing rod 120 movable with respect to the flask 110, a filter system 130 attached to an end of the pressing rod 120, and a handle 140 releasably attached to the flask 110. The French press 100 may include a lid 150 configured to cover an opening of the flask 110. The pressing rod 120 may extend into or through the lid 150 and have a knob 160 provided at an end of the pressing rod 120 to manipulate the pressing rod and the filter system 130. A user can brew coffee in the French press 100 using conventional techniques.

The flask 110 includes a pouring spout 112 at an upper end of the flask. The lid 150 includes a grille 152 opposite the pouring spout 112. By providing both the pouring spout 112 and the grille 152, any brewed coffee can be poured out of the French press in a controlled manner. The flask 110 may be made from tempered glass and the lid 150 may be made from plastic, such as, polypropylene. It is understood that the flask 110 and lid 150 may be made from other suitable materials.

The pressing rod 120 and filter system 130 are movable vertically within the flask 110. Because the pressing rod 120 at least extends into the lid 150, the lid 150 can help guide the motion of the pressing rod 120 and filter system 130 relative to the flask 110. The pressing rod 120 may be made of metal, such as, aluminum, or other suitable materials. The filter system 130 may include a spring 132, one or more drain plates 134, and a mesh 136. The components of the filter system 130 may be made of stainless steel or other suitable materials.

The handle 140 includes a ring portion 142 extending from a first end of the handle 140 to encircle the flask 110 and a base portion 144 extending from a second end of the handle 140 to support a bottom surface of the flask 110. The base portion 144 may have a lip encircling the flask 110 to provide increased stability for the flask 110 while attached to the handle 140. The handle may be made of plastic, such as, polypropylene, or other suitable materials.

In order to increase the stability of the flask 110 in the handle 140, a stopper assembly 200 is provided in the handle 140. The particulars of the stopper assembly 200 will be described with reference to FIGS. 3 and 4 below.

Figure 3:
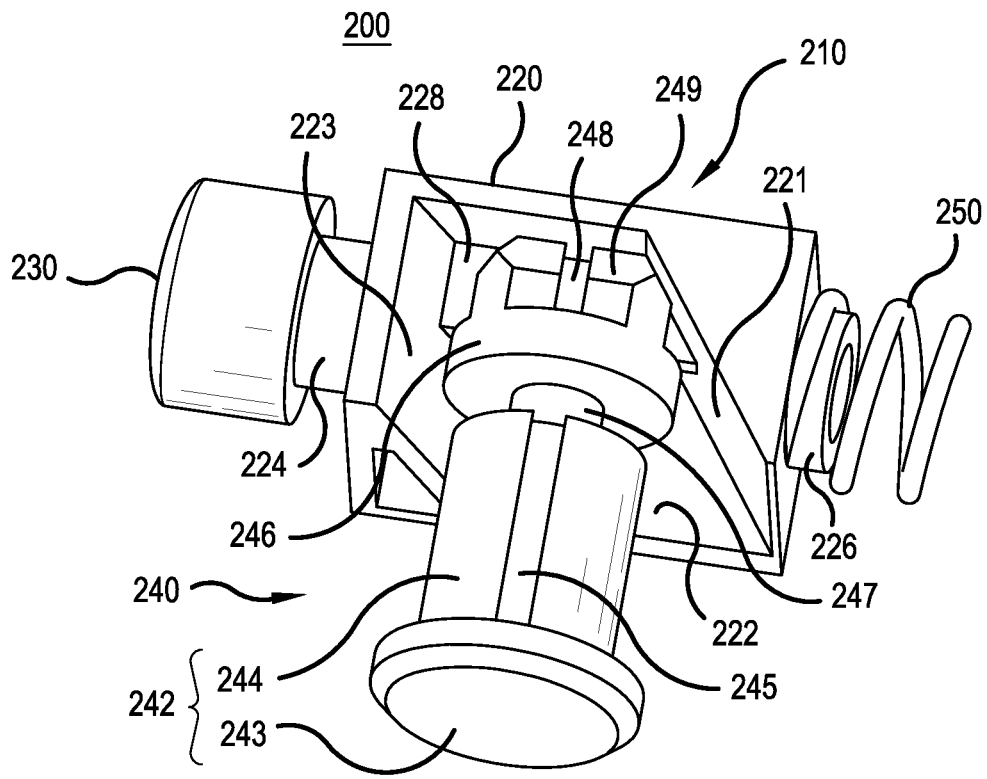
FIG. 3 is a perspective view of a stopper assembly of the French press of FIG. 1.

As shown in FIG. 3, the stopper assembly 200 includes a stopper 210, a button 240, and a biasing member 250. The stopper 210 has a stopper body 220 and a stopper cap 230 affixed to the stopper body. In this exemplary embodiment, the stopper body 220 has a base portion 222, a first protrusion 224, and a second protrusion 226 opposite the first protrusion 224. The stopper cap 230 is located on the first protrusion 224 and the biasing member 250 is located at the second protrusion 226. The stopper body 220 also includes a guide 228 spaced from the base portion 222, an angled surface 221, and an inclined surface 223. The angled surface 221 is arranged to intersect an axis defined by the first protrusion 224 and the second protrusion 226.

The stopper body 210 may be made of plastic, such as, polypropylene, or other suitable materials, and the stopper cap 230 may be made of silicone as it will contact the flask 110. The biasing member 250 may be a coil spring made of stainless steel or other suitable materials. In case of a coil spring, the spring stiffness should be selected to provide enough frictional force between the stopper cap 230 and the flask 110 to prevent slippage of the flask 110 out of the handle 140 when the stopper cap 230 is pressed against the flask 110.

Figure 4:
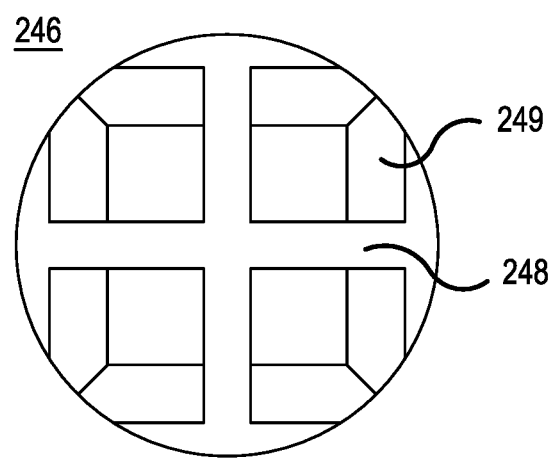
FIG. 4 is an elevation view of an end of the button of the French press of FIG. 1.

The button 240 is formed of a first member 242 and a second member 246 connected to the first member 242. The first member 242 includes a head 243 exposed outside the handle 140 and a shaft 244 received within the handle 140. A pair of grooves 245 may be provided in the shaft 244. The second member 246, which may be referred to as an end of the button, contacts the stopper 210 to cause displacement of the stopper 210. The end of second member 246 closest to the shaft 244 may have a protrusion 247 that is receivable in a cavity at an end of the shaft 244. As shown in FIG. 4, the second member 246 has a pair of intersecting grooves 248 at an end opposite the projection 247. The pair of intersecting grooves 248 divides the end of the second member into four protrusions 249, each of which can be chamfered. The first member 242 may be made of plastic, such as, ABS, and the second member 246 may be made of plastic, such as, polypropylene. While the first member 242 and second member 246 may be made of different plastics, it is understood that they could be made from the same material.

Figure 5:
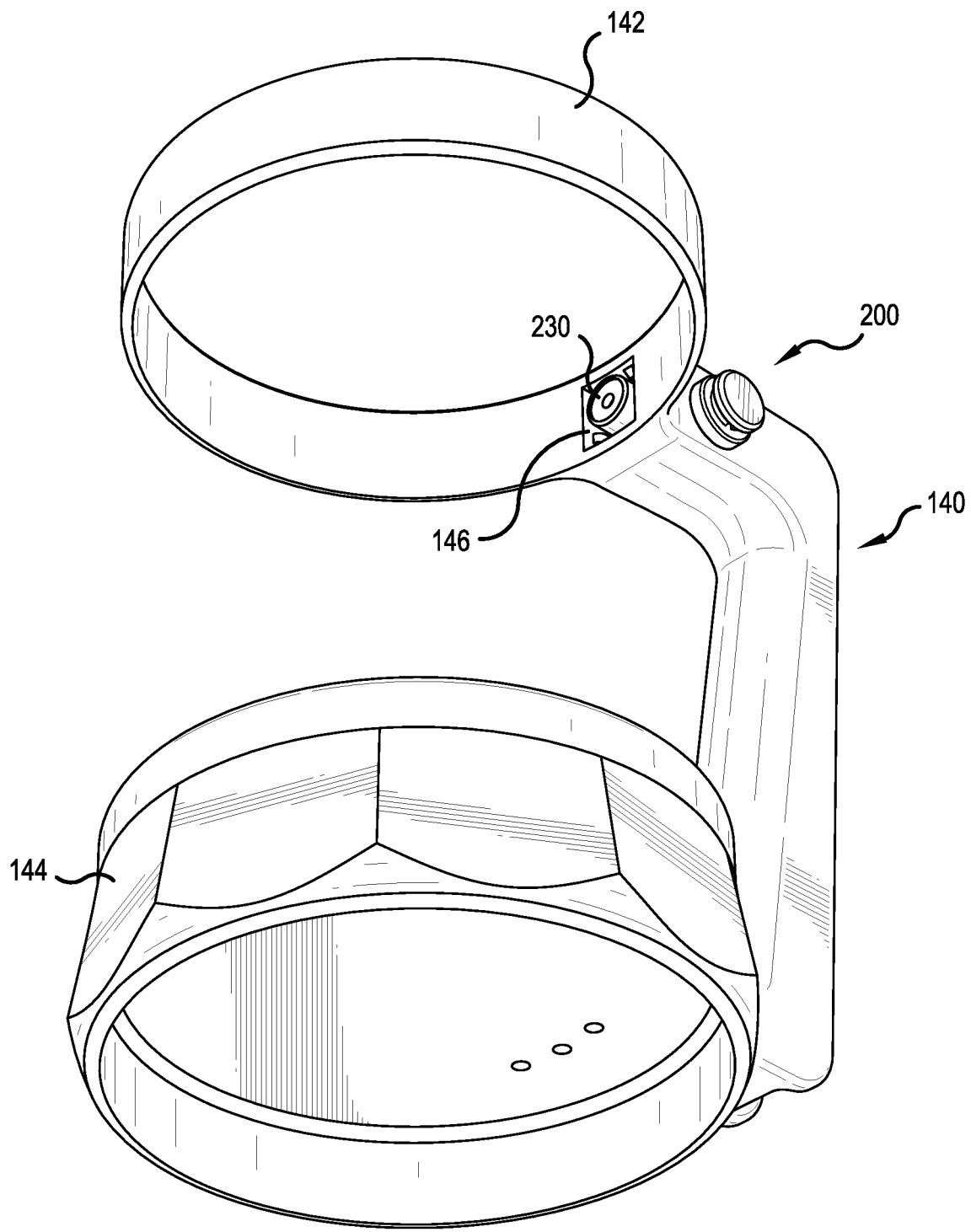
FIG. 5 is a perspective view of a handle of the French press of FIG. 1.
Figure 6:
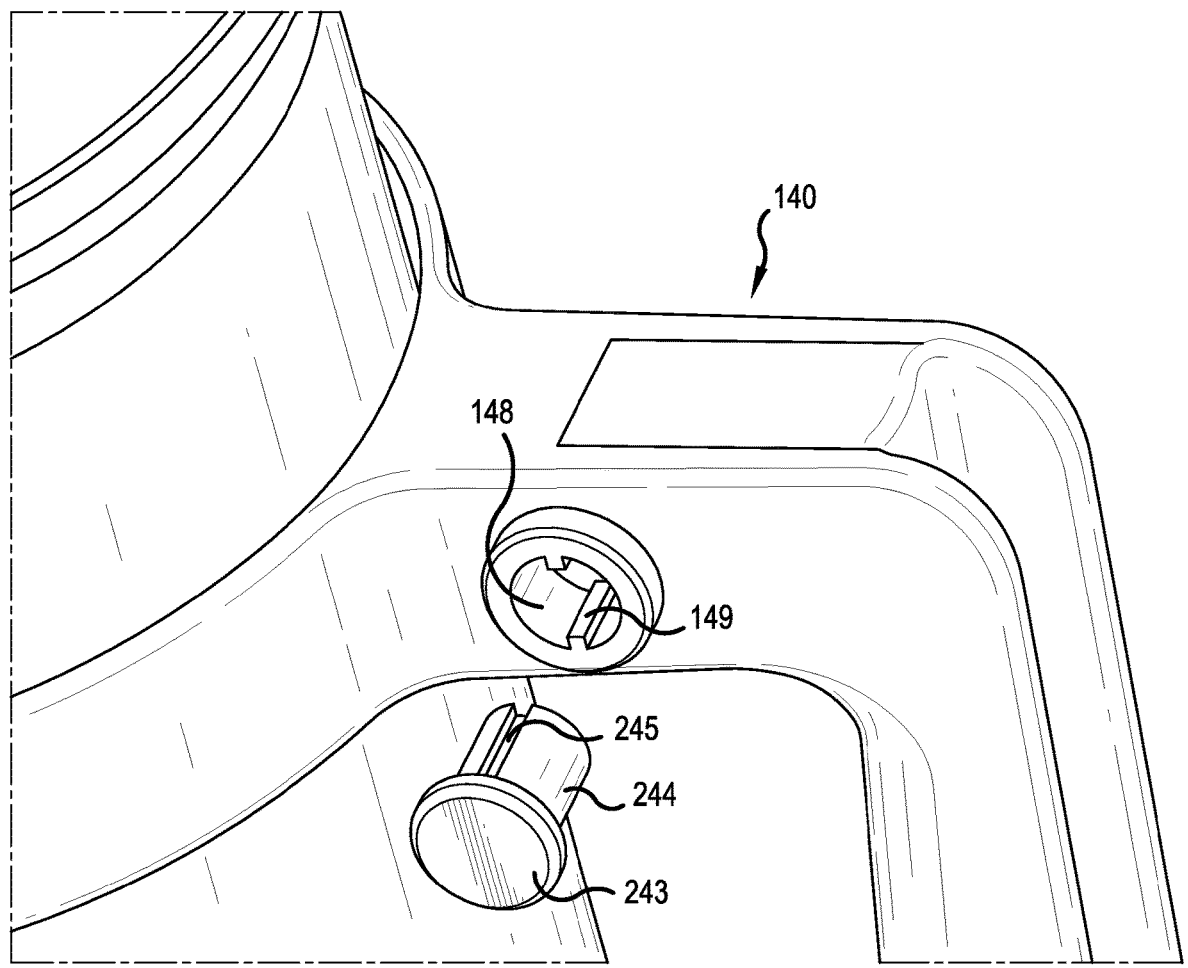
FIG. 6 is a partially exploded view of the stopper assembly and handle of the French press of FIG. 1.

As shown in FIGS. 5 and 6, the handle 140 includes a stopper cavity 146 in the first end of the handle 140 at a same height as the ring portion 142. The stopper 210, stopper cap 230, and biasing member 250 are received in the stopper cavity 146. The handle 140 also includes a button through-hole 148 on a side of the handle 140. A pair of protrusions 149 extend from a perimeter of the button through-hole 148 and engage the pair of grooves 245 in the shaft 244. The pair of protrusions 149 and the pair of grooves 245 serve to prevent the button 240 from rotating within the button through-hole 148. While a pair of protrusions 149 and a pair of grooves 245 are provided, it is understood that a single protrusion and a single groove would also work.

To assemble the stopper assembly 200, the stopper 210, stopper cap 230, biasing member 250, and the second member 246 of the button 240 are inserted into the stopper cavity 146. Then, the first member 242 of the button 240 is inserted through the button through-hole 148 to connect to the second member 246. For example, the protrusion 247 on the end of the second member 246 can be received in the cavity formed in the end of the shaft 244. It is understood that the first member 242 can be joined to the second member 246 using other techniques so long as the second member 246 is already located within the stopper cavity 146 when the first member 242 and the second member 246 are connected. In this arrangement, an axis of the button 240 is perpendicular to an axis defined by the first projection 224 and the second projection 246. A diameter of the second member 246 may be greater than a diameter of the button through-hole 148 to prevent the button 240 from falling out of the handle 140 after assembly.

Figure 7A:
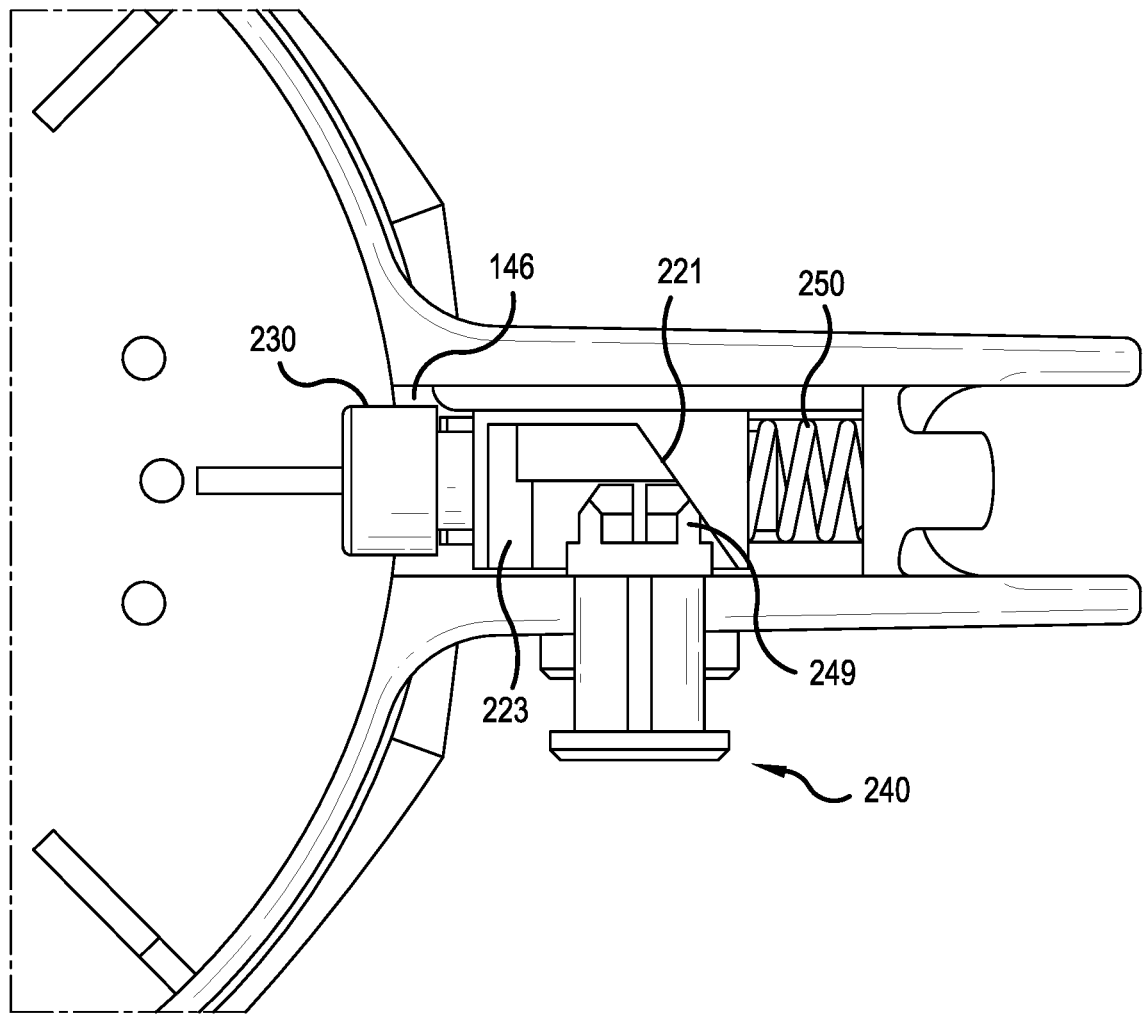
FIGS. 7A and 7B are top views of the stopper assembly of FIG. 3 with a portion of the handle removed.
Figure 7B:
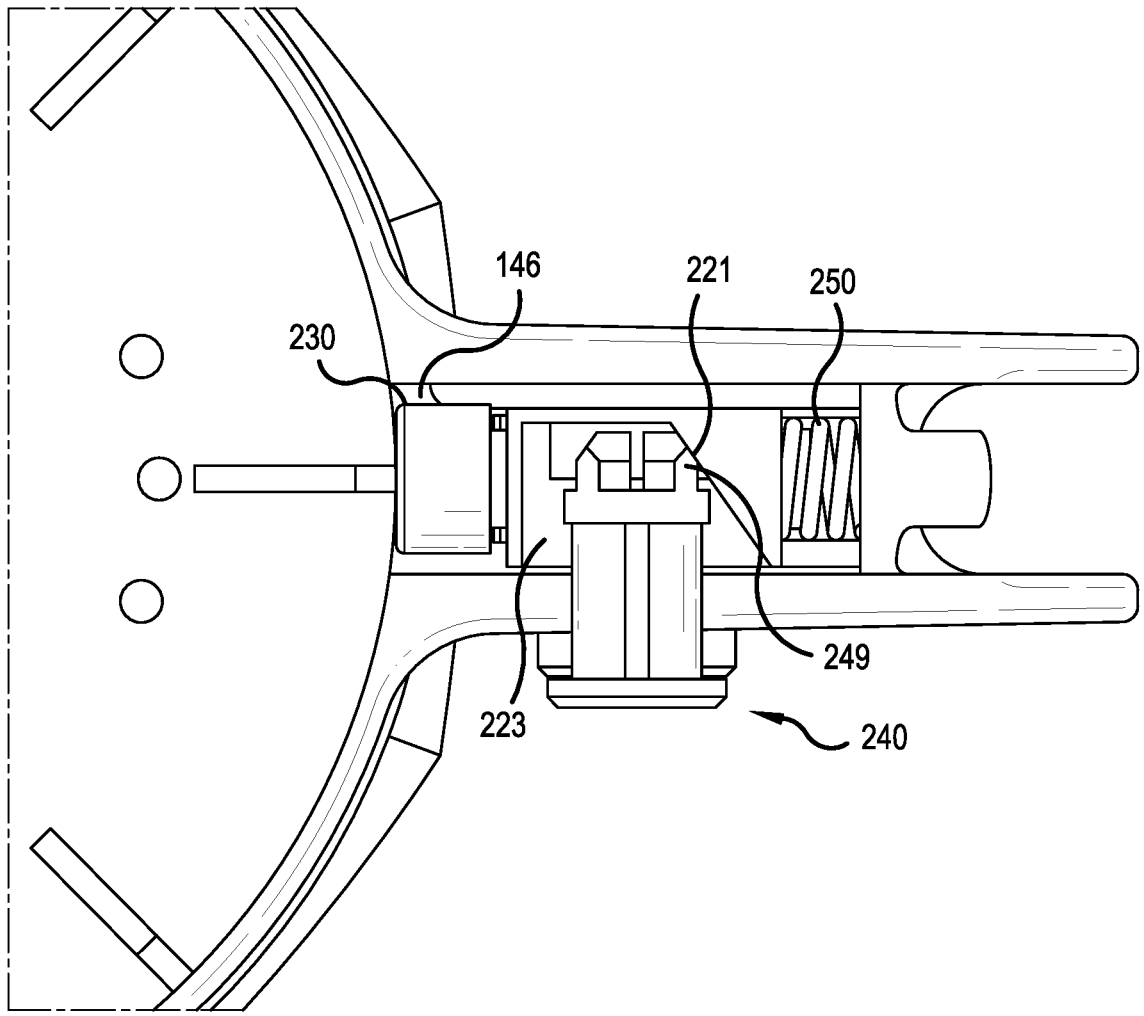

As shown in FIG. 7A, when the button 240 is not pressed by a user, the stopper assembly 200 is in a position where the stopper cap 230 can contact the flask 110 to resist slippage of the flask 110 relative to the handle 140. As shown in FIG. 7B, pressing the button 240 towards the handle 140 causes the stopper cap 230 to move away from the flask 110 along the axis defined by the first projection 224 and the second projection 246. Namely, due to contact between protrusion 249 of the second member 246 and the angled surface 221, movement of the button 240 towards the handle 140 causes the stopper 210 to move away from the flask 110. In addition, as the button 240 is pressed towards the handle 140, the guide 228 is received in one of grooves of the pair of intersecting grooves 248 at the end of the second member 246. This serves to prevent the second member 246 from rotating within the handle 140. Releasing the button 240 allows the stopper to return to the position shown in FIG. 7A based on the force provided by the biasing member 250.

The displacement of the stopper 210 relative to the handle 140 can be limited by contact between the second member 246 and the inclined surface 223 of the stopper body 220. That is, by controlling the spacing between the angled surface 221 and the inclined surface 223, a predetermined displacement of the stopper 210 within the handle 140 can be set. For example, the predetermined displacement can be set to allow for full retraction of the stopper cap 230 inside the handle 140 to allow easy removal of the flask 110 from the handle 140.

By providing the stopper assembly 200, the flask 110 can be securely held by the handle until a user pushes the button 240 to release the flask 110. That is, a user does not have to worry about the flask 110 slipping out of the handle 140 when coffee is poured out of the flask. In addition, a user can quickly release the flask 110 from the handle for cleaning.

The French press thus being described, it will be obvious that the same may be varied in many ways. Such variations are not to be regarded as a departure from the spirit and scope of the disclosure, and all such modifications as would be obvious to one skilled in the art are intended to be included within the scope of the following claims.

What is claimed is:

1. A French press, comprising:
   a flask;
   a pressing rod movable with respect to the flask;
   a filter system attached to an end of the pressing rod;
   a handle releasably attached to the flask; and
   a stopper assembly located in the handle, the stopper assembly including:
      a stopper movable relative to the handle; and
      a biasing member contacting the stopper, the biasing member being arranged to press the stopper towards the flask.

2. The French press according to claim 1, wherein the stopper assembly further includes a button engaging the stopper such that movement of the button towards the stopper moves the stopper away from the flask.

3. The French press according to claim 2, wherein the stopper includes:
   a stopper body, the stopper body having a first protrusion and a second protrusion opposite the first protrusion; and
   a stopper cap located at the first protrusion and configured to contact the flask when the biasing member presses the stopper towards the flask, and
   wherein the biasing member is located at the second protrusion.

4. The French press according to claim 3, wherein the stopper body includes:
   a base portion; and
   an angled surface extending normal to the base, the angled surface being arranged to intersect an axis defined by the first and second protrusions, and
   wherein the button includes:
   a head exposed outside the handle; and
   an end located inside the handle, the end of the button contacting the angled surface of the stopper body such that movement of the button towards the stopper body causes the stopper body to move along the axis defined by the first and second protrusions.

5. The French press according to claim 4, where the end of the button is chamfered.

6. The French press according to claim 4, wherein the stopper body includes a guide spaced from the base portion, and
   wherein the end of the button includes a groove configured to receive the guide to prevent rotation of the button as the button moves towards the stopper body.

7. The French press according to claim 4, wherein the stopper body includes an inclined surface spaced from the angled surface, the inclined surface being arranged to limit movement of the stopper away from the flask by contacting the button after the stopper has moved a predetermined distance away from the flask.

8. The French press according to claim 4, wherein an axis of the button is perpendicular to the axis defined by the first and second protrusions.

9. The French press according to claim 2, wherein the button includes:
   a first member exposed outside the handle; and
   a second member connected to the first member, the second member contacting the stopper.

10. The French press according to claim 9, wherein the first member includes:
    a head; and
    a shaft extending into the handle.

11. The French press according to claim 10, wherein the handle includes a button through-hole having one of a protrusion or a notch, and
    wherein the shaft has one of a groove configured to engage the protrusion or a rib configured to engage the notch to prevent rotation of the button in the button through-hole.

12. The French press according to claim 10, wherein the handle includes a button through-hole having a pair of protrusions, and
    wherein the shaft has a pair of grooves corresponding to the pair of protrusions, the pair of grooves being configured to cooperate with the pair of protrusions to prevent rotation of the button in the button through-hole.

13. The French press according to claim 12, wherein the handle includes a ring portion encircling the flask.

14. The French press according to claim 13, wherein the handle includes a stopper cavity located at a same height as the ring portion on the handle, and
    wherein the button through-hole is in communication with the stopper cavity.

15. The French press according to claim 13, wherein the handle includes a base spaced apart from the ring portion to support a bottom surface of the flask.

16. The French press according to claim 2, wherein the handle includes:
   a ring portion extending from a first end of the handle to encircle the flask; and
   a base portion extending from a second end of the handle to support a bottom surface of the flask.

17. The French press according to claim 16, wherein the handle includes a stopper cavity located at a same height as the ring portion on the handle.

* * * * *